United States Patent [19]
Lin

[11] Patent Number: 6,074,767
[45] Date of Patent: Jun. 13, 2000

[54] SPIN VALVE MAGNETORESISTIVE HEAD WITH TWO SETS OF FERROMAGNETIC/ ANTIFERROMAGNETIC FILMS HAVING HIGH BLOCKING TEMPERATURES AND FABRICATION METHOD

[75] Inventor: Tsann Lin, Saratoga, Calif.

[73] Assignee: International Business Machines Corporation, Armonk, N.Y.

[21] Appl. No.: 09/041,856

[22] Filed: Mar. 12, 1998

[51] Int. Cl.[7] ....................................................... G11B 5/66
[52] U.S. Cl. ................. 428/692; 428/694 R; 428/694 T; 428/694 TM; 428/694 TS; 428/900; 360/113; 324/252; 324/207.21; 338/32 R; 427/128; 427/129; 427/130
[58] Field of Search ............................... 428/694 R, 692, 428/694 T, 694 TM, 694 TS, 900; 360/113; 324/252, 207.21; 338/32 R; 427/128–130

[56] References Cited

U.S. PATENT DOCUMENTS

| | | | |
|---|---|---|---|
| 4,785,366 | 11/1988 | Krounbi et al. | 360/113 |
| 5,206,590 | 4/1993 | Dieny et al. | 324/252 |
| 5,287,238 | 2/1994 | Baumgart | 360/113 |
| 5,329,413 | 7/1994 | Kondoh et al. | 360/113 |
| 5,492,720 | 2/1996 | Gill et al. | 427/131 |
| 5,508,866 | 4/1996 | Gill et al. | 360/113 |
| 5,528,440 | 6/1996 | Fontana | 360/113 |
| 5,552,949 | 9/1996 | Hashimoto et al. | 360/113 |
| 5,583,725 | 12/1996 | Coffey et al. | 360/113 |
| 5,657,191 | 8/1997 | Yuan | 360/113 |

FOREIGN PATENT DOCUMENTS

| | | |
|---|---|---|
| 9063021 | 6/1996 | Japan . |
| 9147325 | 9/1996 | Japan . |

OTHER PUBLICATIONS

S. Mao et al. "NiMn–pinned spin valves with high pinning field made by ion beam sputtering", Appl. Phys Lett.69(23), Dec. 2, 1996, pp. 3593–3595.

"Improved exchange coupling between ferromagnetic Ni–Fe and antiferromagnetic Ni–Mn–based films", Appl. Phys.Lett.65 (9), Aug. 29, 1994, pp. 1183–1185; Tsan Lin, et. al.

"Exchange Coupling between Antiferromagnetic Mn–Ir and Ferromagnetic Ni–Fe Layers", Jpn.J.Appl.Phys. vol. 35, Part 1, No. 2A, Feb., 1996, K. Hoshino, et. al.

"Spin–valve giant magnetoresistive films with antiferromagnetic Ir–Mn layers", J.Appl.Phys.81(8), Apr. 15, 1997, pp. 4004–4006, H.N. Fuke, et. al.

*Primary Examiner*—Leszek Kiliman
*Attorney, Agent, or Firm*—John H. Holcombe

[57] ABSTRACT

Disclosed are spin valve magnetoresistive heads, air bearing sliders and magnetic storage systems employing spin valve magnetoresistive heads, and methods for fabricating spin valve magnetoresistive heads and air bearing sliders employing spin valve magnetoresistive heads. The spin valve magnetoresistive head in accordance with the present invention employs two antiferromagnetic films, one exchange-coupling to the reference layer in a first direction in the read region and the other exchange-coupling to the ferromagnetic film in a second direction substantially perpendicular to the first direction in the end regions. The exchange-coupled reference layer and the first antiferromagnetic film exhibit a blocking temperature equal to or greater than 300° C. The exchange-coupled ferromagnetic/second antiferromagnetic films exhibit a blocking temperature equal to or greater than 200° C. The two high blocking temperatures ensure thermal stabilty during sensor operation.

33 Claims, 4 Drawing Sheets

SPIN VALVE MAGNETORESISTIVE HEAD WITH TWO SETS OF FERROMAGNETIC/ ANTIFERROMAGNETIC FILMS HAVING HIGH BLOCKING TEMPERATURES AND FABRICATION METHOD

TECHNICAL FIELD

This invention relates to magnetoresistive heads, and, more particularly, to spin valve magnetoresistive heads, air bearing sliders and magnetic storage systems employing spin valve magnetoresistive heads, and the methods for fabricating spin valve magnetoresistive heads and air bearing sliders employing spin valve magnetoresistive heads.

BACKGROUND OF THE INVENTION

In a spin valve magnetoresistive head, a spin valve magnetoresistive sensor is sandwiched in top and bottom read gap layers, and is contacted by longitudinal bias and conductor layers in the end regions of the sensor. The sensor detects magnetic field signals through the resistance changes of the sensor as a function of the strength of the magnetic flux being sensed by the sensor. A pronounced magnetoresistance, called giant magnetoresistance (GMR), is employed in spin valve magnetoresistive sensors, the essential feature being at least two ferromagnetic films separated by a nonferromagnetic spacer layer.

A spin valve sensor may comprise a sandwich structure comprising two ferromagnetic films separated by a nonmagnetic spacer layer in which the magnetization of one of the ferromagnetic films (called a reference layer) is "pinned". The pinning may be achieved by either depositing the reference layer on top of an antiferromagnetic film or by depositing the antiferromagnetic film on top of the reference layer in the presence of a magnetic field oriented in a first direction, typically called the "transverse" direction. The sensor detects magnetic field signals through the resistance changes of the sensor as a function of the strength of the magnetic flux being sensed by the sensor. The spin valve sensor is typically employed to read data recorded as magnetic field signals on a recording surface of a recording medium. Examples of recording media include magnetic disks which rotate at high speed, or magnetic tapes which are moved in a linear fashion. The spin valve sensor is typically closely spaced from the recording surface, often on an air bearing slider which has an air bearing surface which rides on an air bearing at the surface of a rotating disk, but also as a contact or near contact transducer. The "transverse direction" in a sensor is typically perpendicular to the recording surface and perpendicular to the air bearing surface of the slider.

The ferromagnetic sense layer may also have its magnetization in the end regions (those portions of the sense layer on either side of the read region) pinned by another antiferromagnetic film or a hard magnetic film for sensor stability. To ensure this pinning, a high unidirectional anisotropy field ($HU_{UA}$), induced by exchange coupling between the ferromagnetic and antiferromagnetic films, is needed in the antiferromagnetic stabilization scheme, while a high coercivity ($H_c$) of the hard magnetic film is needed in the hard magnetic stabilization scheme. The magnetization of the ferromagnetic sense layer in the end regions must be at an angle approximating the perpendicular to the magnetization of the reference layer, and preferably perpendicular to the magnetization of the pinned layer such that the magnetization is parallel to the air bearing surface or to the recording surface (called the longitudinal direction). Only the magnetization of the ferromagnetic sense layer in the read region is not rigidly pinned by an antiferromagnetic film or a hard-magnetic film. However, three magnetic fields coexist in the ferromagnetic sense layer. One is a demagnetizing field ($H_D$) produced by magnetostatic coupling between the sense and reference layers, one is a ferromagnetic/ferromagnetic coupling field ($H_F$) across the spacer layer, and the other is a sense-current-induced field ($H_I$). With an optimal design, $H_D$ is balanced by the sum of $H_F$ and $H_I$, so that the magnetization of the sense layer is oriented in the longitudinal direction. In the presence of an external magnetic field, the magnetization of the sense layer rotates and this rotation changes the resistance characteristics of the sensor due to GMR effects.

As described in coassigned U.S. Pat. No. 5,528,440, Fontana et al., issued Jun. 18, 1996, the magnetization of the ferromagnetic film in the end regions may also be pinned by exchange coupling to an antiferromagnetic film. In order to pin the end region magnetization in a direction perpendicular to the magnetization of the reference layer, different antiferromagnetic materials are used. Specifically, the reference layer in the spin valve sensor is pinned by exchange coupling to an iron-manganese (Fe—Mn) film. An antiferromagnetic nickel-manganese (NiMn) film is used in the end regions. Exchange-coupled Ni—Fe/Fe—Mn films in the read region have a blocking temperature (where exchange coupling disappears) of 150° C., substantially lower than that of exchange-coupled Ni—Fe/Ni—Mn films (>450° C.) in the end regions.

In fabrication, after all of the films have been deposited, the sensor is placed in an annealing oven and heated to a temperature of approximately 240° C. in the presence of an applied magnetic field in the longitudinal direction. When heated, the Ni—Mn film becomes antiferromagnetic and, after cooling in the presence of a magnetic field, the magnetization of the ferromagnetic film in the end regions becomes pinned by the Ni—Mn film. Then, the sensor is again heated in the presence of a magnetic field, perpendicular to the previous magnetic field direction. Heating the sensor to approximately 180° C. and cooling in the presence of the magnetic field allows the magnetization of the reference layer to be pinned by the Fe—Mn film in the transverse direction.

However, two problems have prevented practical application of the Fe—Mn film in the spin valve magnetoresistive sensor, despite their strong antiferromagnetism. One problem is the low resistance to corrosion exhibited by the Fe—Mn film which causes great difficulty in implementing it into the fabrication process. Another problem is the low blocking temperature of the Ni—Fe/Fe—Mn films. The magnetization of the reference layer will be canted during operation of the sensor at a drive temperature (~120° C.).

Hence, most practical spin valve sensors employ an antiferromagnetic film in the read region for sensor operation and a hard-magnetic film in the end regions for sensor stability. The use of this hard-magnetic stabilization scheme for the 1 Gb/in2 spin valve sensor with a 8 nm thick sense layer leads to good read performance, such as quiet GMR responses, high read sensitivity and effective side reading suppression. To perform magnetic recording beyond 1 Gb/in2, the sense layer thickness must be reduced, and the hard magnetic film thickness must be correspondingly reduced for optimal moment matching to attain sensor stability and yet retain high signal sensitivity. Since $H_c$ decreases as the hard magnetic film thickness decreases, GMR responses may show hysteretic noises. In addition, stray fields of the hard magnetic film cause the edges of the spin valve sensor to be ineffective in reading signals, and the size of this ineffective zone ($\geq 0.1$ μm in each edge) does not decrease as the submicron width of the sensor further decreases for a high track density. Hence, the hard magnetic stabilization scheme may not be viable for the multigigabit recording density. In contrast, since $HU_{UA}$ increases as the ferromagnetic film thickness decreases, the antiferromagnetic stabilization scheme is preferred for the multigigabit magnetic recording.

SUMMARY OF THE INVENTION

It is an object of the present invention to provide a spin valve head with strong thermal stability.

Disclosed are spin valve magnetoresistive heads, air bearing sliders and magnetic storage systems employing spin valve magnetoresistive heads, and methods for fabricating spin valve magnetoresistive heads and air bearing sliders employing spin valve magnetoresistive heads.

The spin valve magnetoresistive head in accordance with the present invention employs two antiferromagnetic films, one exchange-coupling to the reference layer in the read region and the other exchange-coupling to the ferromagnetic film in the end regions, and is fabricated with annealing the first antiferromagnetic film to develop exchange coupling in the read region, and then depositing the second antiferromagnetic film to accomplish exchange coupling in the end regions.

The spin valve magnetoresitive head comprises a spin valve magnetoresistive sensor in the read region (also called "active" or "sensor" region) and longitudinal bias and conductor layers in the end regions. The spin valve magnetoresistive sensor comprises a ferromagnetic sense layer, a nonmagnetic spacer layer adjacent to and in contact with the ferromagnetic sense layer, a ferromagnetic reference layer adjacent to and in contact with the nonmagnetic spacer layer, a first antiferromagnetic film adjacent to and in contact with the ferromagnetic reference layer and exchange-coupling therewith for pinning the magnetization of the ferromagnetic reference layer in a first direction, and the exchange-coupled reference layer/first antiferromagnetic film exhibiting a blocking temperature equal to or greater than 300° C. Longitudinal bias layers are provided in the end regions for pinning the magnetization of the ferromagnetic film in a second direction perpendicular to the first direction, the longitudinal bias layers comprising a ferromagnetic film and a second antiferromagnetic film adjacent to and in contact with the ferromagnetic film and exchange-coupling therewith, the exchange-coupled ferromagnetic/second antiferromagnetic films exhibiting a blocking temperature equal to or greater than 200° C. The two high blocking temperatures ensure thermal stability during sensor operation.

In the process of fabricating the spin valve magnetoresistive head, the first antiferromagnetic film is deposited adjacent to and in contact with the ferromagnetic reference layer in the presence of a magnetic field oriented in the transverse direction. The films are annealed in the presence of a magnetic field oriented in the transverse direction in order to develop exchange coupling between the reference layer and the first antiferromagnetic film and thereby to pin the magnetization of the ferromagnetic reference layer in the transverse direction. After the annealing, bilayer photoresists are applied and exposed in a photolithographic tool to mask the spin valve sensor in the read region, and then developed in a solvent to form an undercut. The films in unmasked end regions are removed by ion milling, and then longitudinal bias and conductor layers are immediately deposited in the unmasked end regions. After the depositions, the bilayer photoresists are lifted off. The longitudinal bias layers comprise a ferromagnetic film and a second antiferromagnetic film. Without annealing, the ferromagnetic film exchange-couples to the second antiferromagnetic film in the end regions.

For a fuller understanding of the present invention, reference should be made to the following detailed description taken in conjunction with the accompanying drawings.

DETAILED DESCRIPTION OF THE INVENTION

Figure 1:
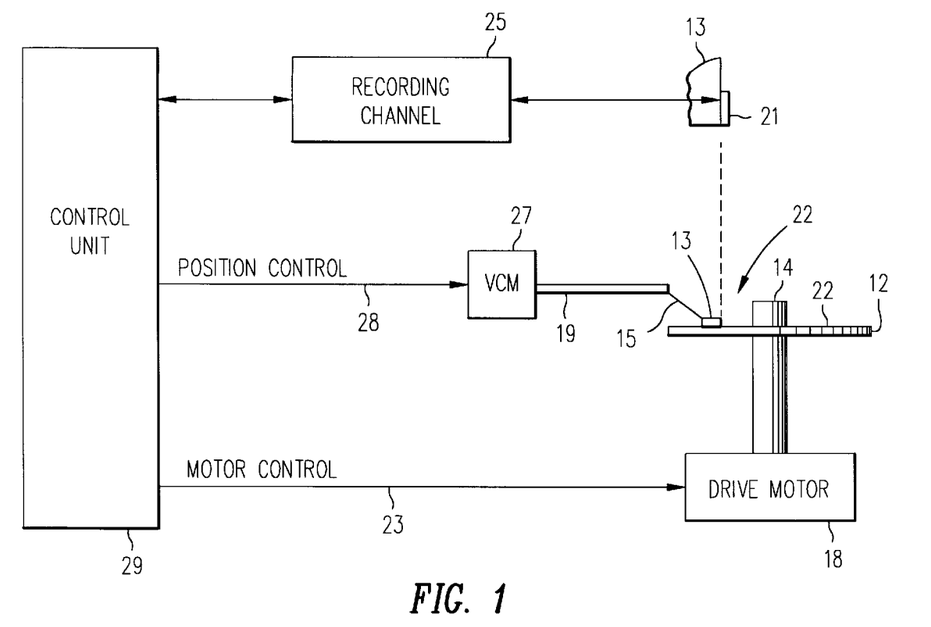
FIG. 1 is a diagrammatic representation of a magnetic disk storage system embodying the present invention.
Figure 2:
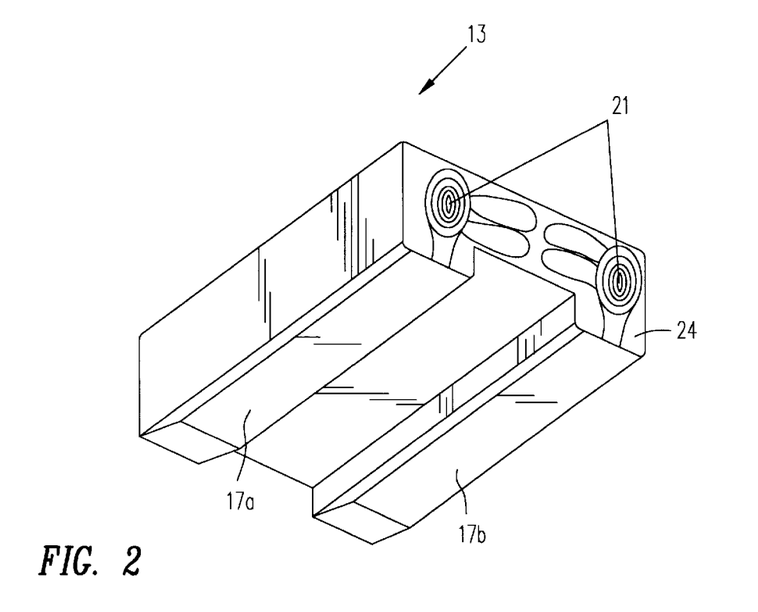
FIG. 2 is a perspective view of a magnetic air bearing slider embodying the present invention which may be employed in the magnetic disk storage system of FIG. 1.

Referring to FIGS. 1 and 2, although the invention is described as embodied in a magnetic disk storage system as shown in FIGS. 1 and 2, it will be apparent that the invention is also applicable to other magnetic recording systems, for example, such as a magnetic tape recording system. In FIGS. 1 and 2, at least one disk 12 is supported on a spindle 14 and rotated by a disk drive motor 18. A magnetic recording medium is on the surface 22 of the disk 12 and the recorded information is in the form of an annular pattern of concentric data tracks (not shown) on the disk 12.

At least one air bearing slider 13 is positioned on the disk 12, each slider supporting one or more magnetic read/write transducers 21 on sensor surface 24, typically referred to as read/write heads. Each slider 13 is attached to an actuator arm 19 by means of a suspension 15. The suspension 15 provides a slight spring force which biases the slider 13 against the disk surface 22. Each actuator arm 19 is attached to an actuator 27 which, for example, may be a voice coil motor (VCM). As the disk(s) are rotated, the slider(s) 13 are moved radially in and out across the disk surface 22 by the actuator 27 so that the heads 21 may access different portions of the disk where desired data is recorded.

During operation of the disk storage system, the rotation of the disk 12 generates an air bearing between air bearing surfaces 17a and 17b, for example, of the slider 13 and the disk surface 22, which exerts an upward force on the slider. The air bearing thus counterbalances the slight spring force of the suspension 15 and supports the slider 13 and transducer(s) 21 in a closely spaced relationship from the recording medium surface 22 of the disk 12. If the recording medium was a tape, the transducer would be in a contact or near contact relationship with the tape.

The various components of the disk storage system are controlled in operation by control signals generated by control unit 29, such as access control signals and internal clock signals. Typically, the control unit 29 comprises logic control circuits, storage or memory, and a microprocessor, for example. The control unit 29 generates control signals to control various system operations such as drive motor control signals on line 23 and head position and seek control signals on line 28. The control signals on line 28 provide the desired current profiles to the voice coil motor 27 to optimally move and position a selected slider 13 to the desired data track on the associated surface 22 of disk 12.

A magnetoresistive sensor in accordance with the present invention forms a part of each transducer 21 and detects magnetic field signals through the resistance (or conductance) changes of the sensor as a function of the strength of the magnetic flux being sensed by the sensor from the recorded signals on the recording medium surface 22. The read signals (and write signals to the write head of transducer 21) are communicated to and from transducer 21 by means of recording channel 25. A detector of the recording channel 25 is coupled to the spin valve magnetoresistive sensor of transducer 21 for detecting changes in the sensor of the transducer 21 responsive to magnetic fields representative of data bits recorded in the magnetic storage medium 22 intercepted by the sensor.

The above description of a magnetic disk storage system is for representative purposes only. It should be apparent that disk storage systems may contain a large number of disks, and each actuator may support a large number of sliders and transducers.

Figure 3:
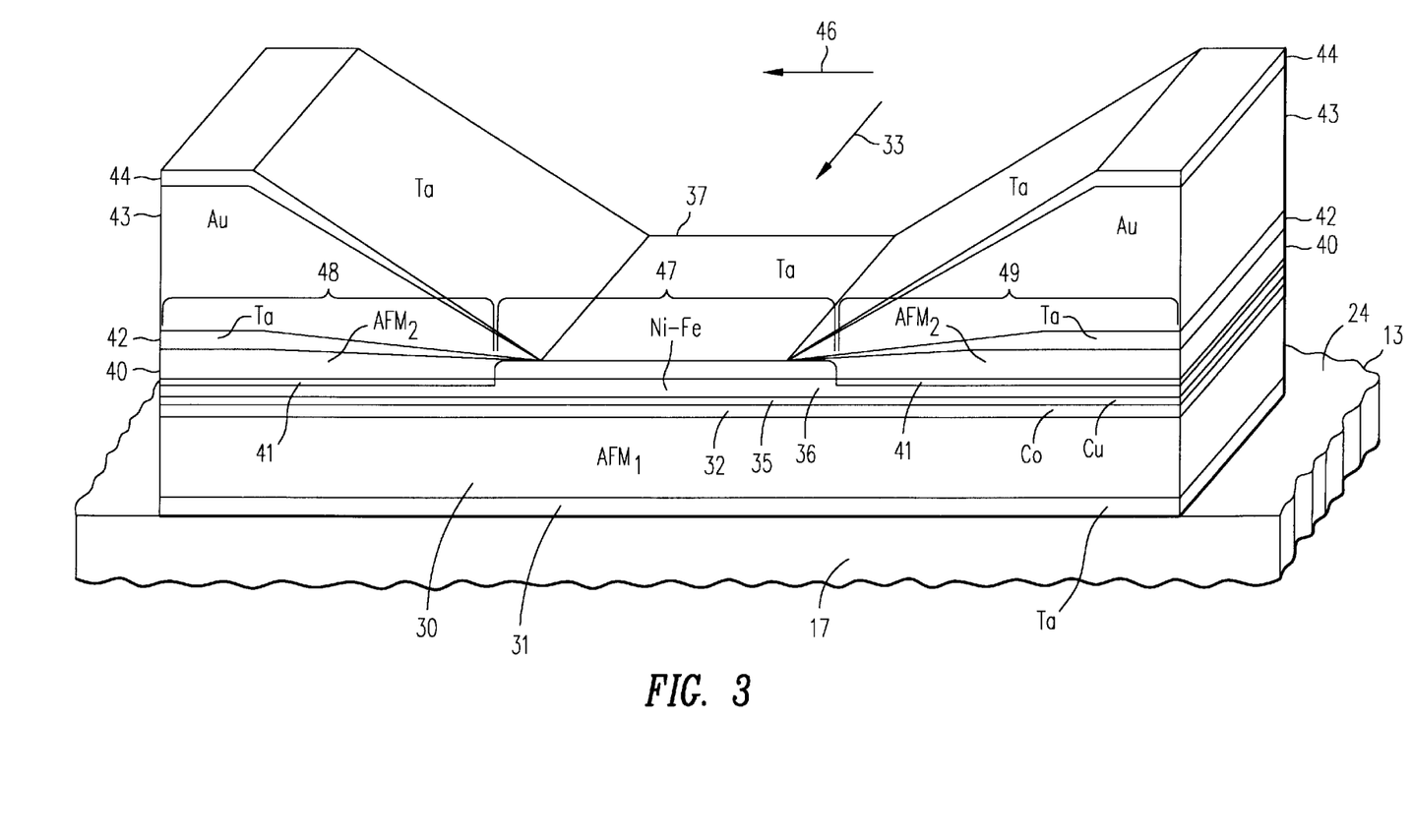
FIG. 3 is a perspective view of an overlaid spin valve sensor in accordance with the present invention.
Figure 4:
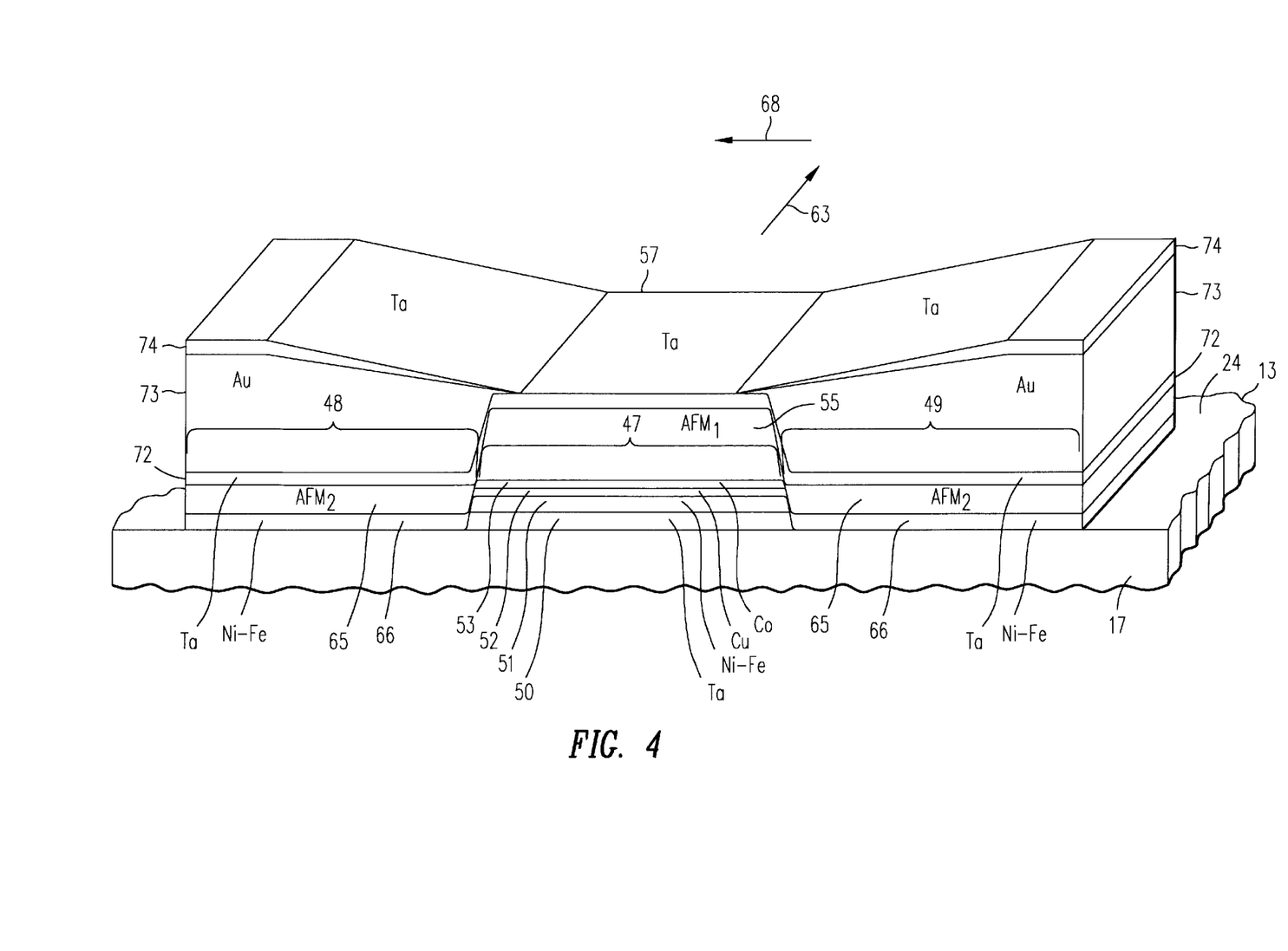
FIG. 4 is a perspective view of an abutted spin valve sensor in accordance with the present invention.

Referring to FIGS. 3 and 4, respectively, an overlaid spin valve sensor and an abutted spin valve sensor are illustrated in accordance with the present invention. Specifically, in both sensors, first and second antiferromagnetic (AFM$_1$ and AFM$_2$, respectively) films are provided for the sensor. One exchange-couples to a ferromagnetic reference layer in the read region 47, exhibiting a blocking temperature equal to or greater than 300° C., and the other exchange-couples to a ferromagnetic film in the end regions 48 and 49, exhibiting a blocking temperature equal to or greater than 200° C. The two high blocking temperatures ensure thermal stability during sensor operation.

Briefly, an overlaid sensor provides the longitudinal bias by employing separate longitudinal bias layers which overlie the sense layer in each of the end regions, and an abutted sensor provides the sense layer only in the center region and the longitudinal bias layers abut and are adjacent the sense layer in the end regions.

Referring first to the overlaid spin valve sensor of FIG. 3, the spin valve magnetoresistive sensor is shown mounted on slider 13 on the sensor surface 24 and at the air bearing surface 17, which may be air bearing surface 17a or 17b in FIG. 2. In a merged head, sensor surface 24 may comprise a shield layer or insulating layer or layer associated with the write head, rather than the slider directly. The first antiferromagnetic film 30 is deposited on an underlayer 31, such as tantalum (Ta), and a ferromagnetic reference layer 32, such as cobalt (Co), is deposited adjacent to and in contact with the antiferromagnetic film 30. The first antiferromagnetic film 30, in accordance with the present invention, is exchange-coupled to the ferromagnetic reference layer and pins the the magnetization of the reference layer in a transverse direction as depicted by arrow 33.

Figure 5:
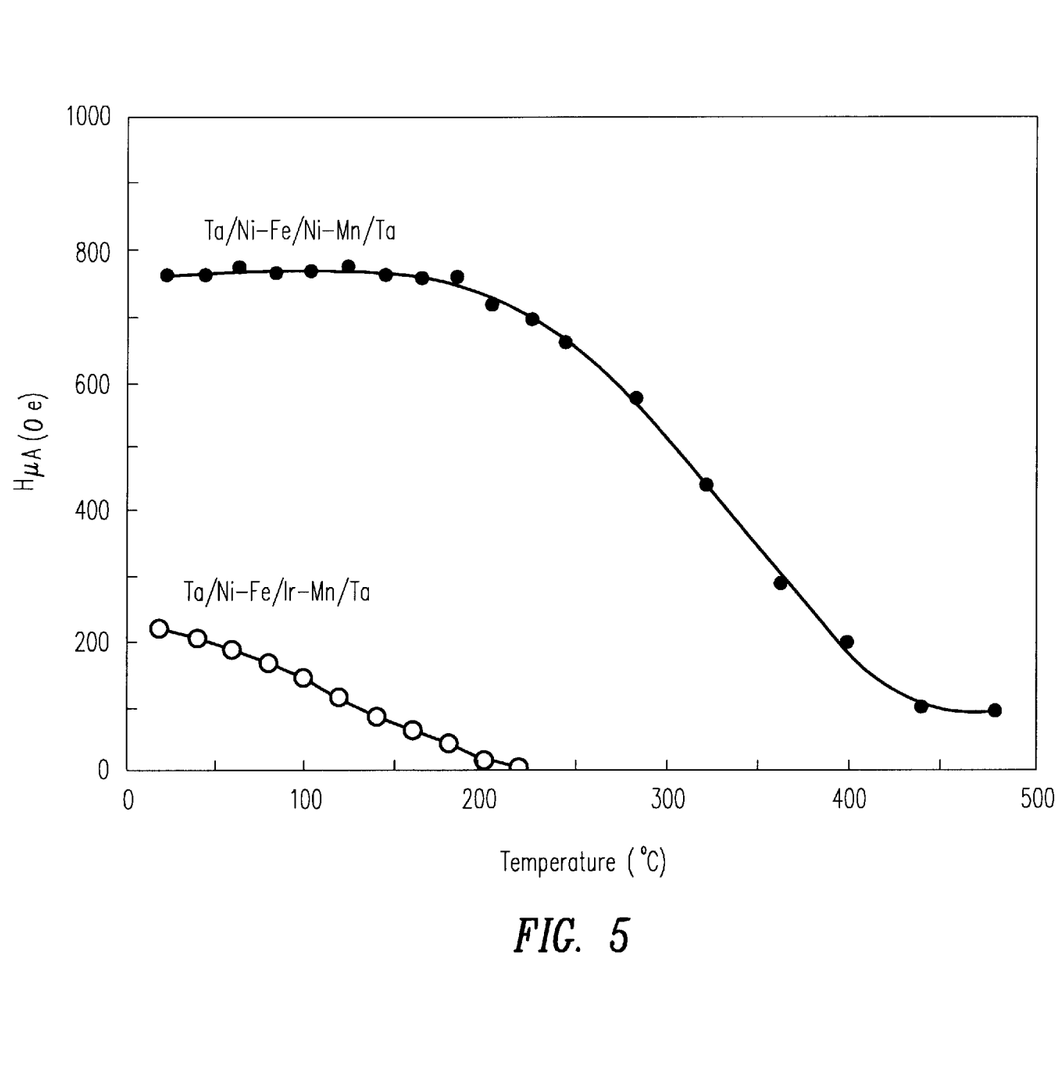
FIG. 5 is a graph of $HU_{UA}$ vs temperature for exemplary annealed Ta/Ni—Fe/Ni—Mn/Ta and as-deposited Ta/Ni—Fe/Ir—Mn/Ta films.

The first antiferromagnetic film 30 is a face-centered-tetragonal (fct) structure and is selected, for example, from one of nickel-manganese (Ni—Mn), palladium-manganese (Pd—Mn), and platinum-manganese (Pt—Mn) based films. The first antiferromagnetic film 30 requires annealing to provide strong exchange coupling, which produces an unidirectional anisotropy field (HU$_{UA}$) in the transverse direction. This HU$_{UA}$ is required to be high enough to counteract demagnetizing fields ($\geq$200 Oe) in the reference layer when the spin valve sensor is operating at a drive temperature (~120° C.). As shown in FIG. 5, Ta(5)/Ni—Fe(5)/Ni—Mn (30)/Ta(5) films (thickness in nm) annealed for 10 hours at 255° C. exhibit an HU$_{UA}$ of 775 Oe at 120° C., much higher than required, and a blocking temperature beyond 450° C. Ta/Ni—Fe/Pd—Mn/Ta and Ta/Ni—Fe/Pt—Mn/Ta films of appropriate thickness and after appropriate annealing also exhibit required HU$_{UA}$'s exceeding 200 Oe and high blocking temperatures (300° C. and 380° C., respectively), as is understood by those of skill in the art.

A nonmagnetic spacer layer 35, such as copper (Cu), is deposited adjacent to and in contact with the reference layer, and a ferromagnetic sense layer 36, such as nickel-iron (Ni—Fe), is deposited adjacent to and in contact with the nonmagnetic spacer layer.

In accordance with the present invention, the underlayer 31, the first antiferromagnetic film 30, the ferromagnetic reference layer 32, the nonmagnetic spacer layer 35, the ferromagnetic sense layer 36, and any protective overcoat layer, such as layer 37, are first deposited in the present of a magnetic field (40 Oe or greater) in a longitudinal or transverse direction. The entire sensor is then annealed, for example, for 10 hours at 255° C. in the presence of the magnetic field oriented in the transverse direction as illustrated by arrow 33, for strong exchange coupling between the first antiferromagnetic film 30 and the ferromagnetic reference layer 32 in the transverse direction. The annealing process is shorter at high temperatures and longer at low temperatures and may range between 2–30 hours and between 240° C. –320° C.

The films may then be conventionally patterned and ion milled to define the sensor central read region.

In accordance with the present invention, a ferromagnetic film 41, such as Ni—Fe, and a second antiferromagnetic film 40 are deposited on the patterned spin valve sensor in the end regions, in the longitudinal direction, to form longitudinal bias layers. Alternatively, the sense layer may not be ion-milled extensively, and the sense layer in the end regions may serve as the ferromagnetic film 41 for exchange coupling to the second antiferromagnetic film. Herein, the longitudinal bias layers may comprise either an antiferromagnetic film 40 and a ferromagnetic film 41, or an antiferromagnetic film 40 and the ferromagnetic sense layer.

The second antiferromagnetic film 40 has either a face-centered-cubic (fcc) structure and is selected, for example, from one of iridium-manganese (Ir—Mn), or rhodium-manganese (Rh—Mn) based films, or has a body-centered-cubic (bcc) structure such as chromium-manganese (Cr—Mn) based film. The second antiferromagnetic film exchange-couples to the ferromagnetic film in the end region after deposition in the presence of a magnetic field oriented in the longitudinal direction (as illustrated by arrow 46), producing an HU$_{UA}$ in the longitudinal direction. This HU$_{UA}$ is required to be high (40 Oe or more) at 120° C. to maintain a single-domain state in the sense layer. As shown in FIG. 5, as-deposited Ta(5)/Ni—Fe(5)/Ir—Mn(15)/Ta(5) films exhibit an HU$_{UA}$ of 114 Oe at 120° C., much higher than required, and a blocking temperature of 230° C. As-deposited Ta/Ni—Fe/Rh—Mn/Ta and Ta/Ni— Fe/Cr—Mn/Ta films also exhibit required HU$_{UA}$'S and high blocking temperatures (230° C. and 270° C., respectively). Such high blocking temperatures ensure thermal stability during sensor operation.

Ideally, the transverse and longitudinal directions are perpendicular to one another. In fact, an exact perpendicular relationship is difficult to acheive, and may vary from 75° to 110°. Hence, herein "perpendicular" is defined as ranging from 75° to 110°.

Conductor layers comprising Ta 42, Au 43 and Ta 44 films may also be deposited on the end regions of the sensor and provide the connections to the recording channel. Ideally, any heat treatments are preferably not employed in the rest of the head fabrication process to ensure the mutual perpendicular orientation relationship between the magnetization of the reference layer in the read region and the magnetization of the ferromagnetic film in the end regions. In reality, some specific steps, such as photoresist hardbake, heat treatments are needed and these should be employed at a temperature of 180° C. or less in the presence of magnetic fields oriented in the longitudinal direction. The magnetic fields are preferably high ($\geq 3500$ Oe) enough for the fields to penetrate into the spin valve sensor sandwiched in top and bottom shields. Experimental data for the spin valve sensor with a reference layer pinned by a Ni—Mn film and with Ni—Fe/Ir—Mn longitudinal bias layers show that such heat treatements result in a proper orientation of the magnetization of the Ni—Fe film in the end region while creating only negligible perturbation of only ~1° in the orientation of the magnetization of the reference layer. This perturbation can be explained based on a model assuming the existence of an ensemble of exchange components, each of which exhibits its own local $HU_{UA}$ and a local blocking temperature, at the interface between the ferromagnetic and antiferromagnetic films. Magnetizations of exchange components with local blocking temperatures lower than the heat treatment temperature will be oriented, and this reorientation results in the perturbation of the entire magnetization. This perturbation will be higher at higher heat treatment temperature. To eliminate this perturbation, a current pulse can be pumped into the spin valve sensor after the head fabrication process. The heat generated from the current pulse and the field induced from the current pulse in the preferred transverse direction will bring the magnetization of exchange components with low local blocking temperatures to the preferred transverse direction.

The air bearing surface 17 may then be fabricated by conventional means, and the head and slider mounted in the disk drive.

Referring next to the abutted spin valve sensor of FIG. 4, the spin valve magnetoresistive sensor is shown mounted on slider 13 on the sensor surface 24 and at the air bearing surface 17, which may be air bearing surface 17a or 17b in FIG. 2. The underlayer 50, ferromagnetic sense layer 51, nonmagnetic spacer layer 52, ferromagnetic reference layer 53, first antiferromagnetic film 55, and any protective overcoat layer 57 are deposited in the presence of a magnetic field (40 Oe or greater) oriented in a longitudinal or transverse direction. The entire sensor element is then annealed, for example, for 10 hours at 255° C. in the presence of the magnetic field oriented in the transverse direction as illustrated by arrow 63, for strong exchange coupling between the first antiferromagnetic film 55 and the ferromagnetic reference layer 53 in the transverse direction. The annealing process is shorter at high temperatures and longer at low temperatures, and may range between 2–30 hours and between 240° C. –320° C. The first antiferromagnetic film 55, such as Ni—Mn, Pd—Mn and Pt—Mn, exchange-coupled to the reference layer, producing $HU_{UA}$ in the transverse direction.

The films may then be conventionally patterned and ion milled to define the sensor central read region.

In accordance with the present invention, ferromagnetic film 66, such as Ni—Fe, and a second antiferromagnetic film 65 are deposited in the end regions in the longitudinal direction, to form longitudinal bias layers. The longitudinal bias layers abut the side edges of the spin valve sensors.

The second antiferromagnetic film, such as Ir—Mn, Rh—Mn and Cr—Mn films, exchange-couples to the ferromagnetic film in the end region after deposition in the presence of a magnetic field oriented in the longitudinal direction (as illustrated by arrow 68), producing an $HU_{UA}$ in the longitudinal direction.

Conductor layers comprising Ta 72, Au 43, and Ta 44 films may also be deposited on the end regions of the sensor and provide the connections to the recording channel.

The longitudinal bias layers, by means of the abutting contact of the ferromagnetic film 66 with the side edge of the spin valve sensor, provides the longitudinal bias field for the ferromagnetic sense layer.

The air bearing surface 17 may then be fabricated by conventional means, and the head and slider mounted in the disk drive.

Other specific arrangements of the various films of the spin valve magnetoresistive head in accordance with the present invention may be envisioned which employs two antiferromagnetic films, and is fabricated with annealing the first antiferromagnetic film to develop exchange coupling in the read region, and then depositing the second antiferromagnetic film to accomplish exchange coupling in the end regions.

While the preferred embodiments of the present invention have been illustrated in detail, it should be apparent that modifications and adaptations to those embodiments may occur to one skilled in the art without departing from the scope of the present invention as set forth in the following claims.

I claim:

1. A spin valve magnetoresistive head comprising a spin valve magnetoresistive sensor in a read region and longitudinal bias layers in end regions, comprising:

said spin valve magnetoresistive sensor comprising a ferromagnetic sense layer, a nonmagnetic spacer layer adjacent to and in contact with said ferromagnetic sense layer, a ferromagnetic reference layer adjacent to and in contact with said nonmagnetic spacer layer, and a first antiferromagnetic film adjacent to and in contact with said ferromagnetic reference layer and requiring annealing to provide strong exchange coupling $H_{UA}$, said sensor annealed in the presence of a magnetic field oriented in a first direction to develop exchange-coupling between said first antiferromagnetic film and said ferromagnetic reference layer for pinning the magnetization of said ferromagnetic reference layer in said first direction, said exchange-coupled ferromagnetic reference layer and first antiferromagnetic film exhibiting a blocking temperature equal to or greater than 300° C.; and said longitudinal bias layers deposited subsequent to said annealing of said sensor and comprising a ferromagnetic film and a second antiferromagnetic film adjacent to and in contact with said ferromagnetic film and exchange-coupling therewith in said end regions for biasing the magnetization of said ferromagnetic sense layer in a second direction, wherein said second direction is different than said first direction, said exchange-coupled ferromagnetic film and second antiferromagnetic film exhibiting a blocking temperature equal to or greater than 200° C.

2. The spin valve magnetoresistive head of claim 1, wherein said first antiferromagnetic film is selected from one of Ni—Mn, Pd—Mn, and Pt—Mn based films.

3. The spin valve magnetoresistive head of claim 1, wherein said second antiferromagnetic film is selected from one of Ir—Mn, Rh—Mn, and Cr—Mn based films.

4. The spin valve magnetoresistive head of claim 1, wherein said spin valve magnetoresistive sensor is annealed for 2–30 hours at a temperature of 240° C.–320° C. to develop said exchange coupling between said ferromagnetic reference layer and said first antiferromagnetic film in said first direction.

5. The spin valve magnetoresistive head of claim 1, wherein said longitudinal bias layers each overlies and is in physical contact with said ferromagnetic sense layer at one of said end regions thereof.

6. The spin valve magnetoresistive head of claim 1, wherein a portion of said ferromagnetic sense layer in each said end region exchange-couples to said second antiferromagnetic film.

7. The spin valve magnetoresistive head of claim 1, wherein said longitudinal bias layers each abuts and is in physical contact with said ferromagnetic sense layer at one of said end regions thereof.

8. A magnetic air bearing slider assembly, comprising:
an air bearing slider, said slider including a spin valve magnetoresistive head, said spin valve magnetoresistive head comprising a spin valve magnetoresistive sensor in a read region and longitudinal bias layers in end regions, said spin valve magnetoresistive head comprising:
a spin valve magnetoresistive sensor comprising a ferromagnetic sense layer, a nonmagnetic spacer layer adjacent to and in contact with said ferromagnetic sense layer, a ferromagnetic reference layer adjacent to and in contact with said nonmagnetic spacer layer, and a first antiferromagnetic film adjacent to and in contact with said ferromagnetic reference layer and requiring annealing to provide strong exchange coupling $H_{UA}$, said sensor annealed in the presence of a magnetic field oriented in a first direction to develop exchange-coupling between said first antiferromagnetic film and said ferromagnetic reference layer for pinning the magnetization of said ferromagnetic reference layer in said first direction, said exchange-coupled ferromagnetic reference layer and first antiferromagnetic film exhibiting a blocking temperature equal to or greater than 300° C.; and
longitudinal bias layers deposited subsequent to said annealing of said sensor and comprising a ferromagnetic film and a second antiferromagnetic film adjacent to and in contact with said ferromagnetic film and exchange-coupling therewith in said end regions for biasing the magnetization of said ferromagnetic sense layer in a second direction, wherein said second direction is different than said first direction, said exchange-coupled ferromagnetic film and second antiferromagnetic film exhibiting a blocking temperature equal to or greater than 200° C.

9. The magnetic air bearing slider assembly of claim 8, wherein said first antiferromagnetic film is selected from one of Ni—Mn, Pd—Mn, and Pt—Mn based films.

10. The magnetic air bearing slider assembly of claim 8, wherein said second antiferromagnetic film is selected from one of Ir—Mn, Rh—Mn, and Cr—Mn based films.

11. The magnetic air bearing slider assembly of claim 8, wherein said longitudinal bias layers each overlies and is in physical contact with said ferromagnetic sense layer at one of said end regions thereof.

12. The magnetic air bearing slider assembly of claim 8, wherein a portion of said ferromagnetic sense layer in each said end region exchange-couples to said second antiferromagnetic film.

13. The magnetic air bearing slider assembly of claim 8, wherein said longitudinal bias layers each abuts and is in physical contact with said ferromagnetic sense layer at one of said end regions thereof.

14. A magnetic data storage system, comprising:
a magnetic storage medium having at least one track for the recording of data;
a magnetic transducer maintained close to said magnetic storage medium during relative motion between the magnetic transducer and said magnetic storage medium, the magnetic transducer including a spin valve magnetoresistive head comprising a spin valve magnetoresistive sensor in a read region and longitudinal bias layers in end regions, said spin valve magnetoresistive head comprising:
a spin valve magnetoresistive sensor comprising a ferromagnetic sense layer, a nonmagnetic spacer layer adjacent to and in contact with said ferromagnetic sense layer, a ferromagnetic reference layer adjacent to and in contact with said nonmagnetic spacer layer, and a first antiferromagnetic film adjacent to and in contact with said ferromagnetic reference layer and requiring annealing to provide strong exchange coupling $H_{UA}$, said sensor annealed in the presence of a magnetic field oriented in a first direction to develop exchange-coupling between said first antiferromagnetic film and said ferromagnetic reference layer for pinning the magnetization of said ferromagnetic reference layer in a first direction, said exchange-coupled ferromagnetic reference layer and first antiferromagnetic film exhibiting a blocking temperature equal to or greater than 300° C.; and
longitudinal bias layers deposited subsequent to said annealing of said sensor and comprising a ferromagnetic film and a second antiferromagnetic film adjacent to and in contact with said ferromagnetic film and exchange-coupling therewith in said end regions for biasing the magnetization of said ferromagnetic sense layer in a second direction, wherein said second direction is different than said first direction, said exchange-coupled ferromagnetic film and second antiferromagnetic film exhibiting a blocking temperature equal to or greater than 200° C.; and
a detector coupled to said spin valve magnetoresistive head for detecting changes in said spin valve magnetoresistive sensor responsive to magnetic fields representative of data bits recorded in said magnetic storage medium intercepted by said spin valve magnetoresistive sensor.

15. The magnetic data storage system of claim 14, wherein said first antiferromagnetic film is selected from one of Ni—Mn, Pd—Mn, and Pt—Mn based films.

16. The magnetic data storage system of claim 14, wherein said second antiferromagnetic film is selected from one of Ir—Mn, Rh—Mn, and Cr—Mn based films.

17. The magnetic data storage system of claim 14, wherein said longitudinal bias layers each overlies and is in physical contact with said ferromagnetic sense layer at one of said end regions thereof.

18. The magnetic data storage system of claim 14, wherein a portion of said ferromagnetic sense layer in each said end region exchange-couples to said second antiferromagnetic film.

19. The magnetic data storage system of claim 14, wherein said longitudinal bias layers each abuts and is in physical contact with said ferromagnetic sense layer at one of said end regions thereof.

20. A method for fabricating a spin valve magnetoresistive head on a substrate, comprising the steps of:
   depositing a spin valve magnetoresistive sensor comprising a ferromagnetic sense layer, a nonmagnetic spacer layer adjacent to and in contact with said ferromagnetic sense layer, a ferromagnetic reference layer adjacent to and in contact with said nonmagnetic spacer layer, and a first antiferromagnetic film adjacent to and in contact with said ferromagnetic reference layer, on said substrate in the presence of a magnetic field;
   annealing said spin valve magnetoresistive sensor in the presence of a magnetic field oriented in a first direction to develop exchange coupling between said first antiferromagnetic film and said ferromagnetic reference layer and thereby pin said ferromagnetic reference film in said first direction, said exchange-coupled ferromagnetic reference layer and first antiferromagnetic film exhibiting a blocking temperature equal to or greater than 300° C.;
   patterning a spin valve magnetoresistive sensor area in a central read region and longitudinal bias/conductor areas in end regions of said layers; and
   depositing longitudinal bias layers in said end regions in the presence of a magnetic field oriented in a second direction, wherein said second direction is different than said first direction, said longitudinal bias layers comprising a ferromagnetic film and a second antiferromagnetic film adjacent to and in contact with said ferromagnetic film, and exchange-coupling therewith, said exchange-coupled ferromagnetic film and second antiferromagnetic film exhibiting a blocking temperature equal to or greater than 200° C.

21. The method for fabricating a spin valve magnetoresistive head of claim 20, wherein said first antiferromagnetic film is selected from one of Ni—Mn, Pd—Mn, and Pt—Mn based films.

22. The method for fabricating a spin valve magnetoresistive head of claim 20, wherein said second antiferromagnetic film is selected from one of Ir—Mn, Rh—Mn, and Cr—Mn based films.

23. The method for fabricating a spin valve magnetoresistive head of claim 20, wherein said annealing step comprises annealing said spin valve magnetoresistive sensor for 2–30 hours at a temperature of 240° C.–320° C. to develop said exchange coupling between said ferromagnetic reference layer and said first antiferromagnetic film.

24. The method for fabricating a spin valve magnetoresistive head of claim 23, additionally comprising the step of heat treating said sensor at a temperature equal to or less than 180° C. in the presence of a magnetic field oriented in said second direction to facilitate orienting said longitudinal bias layers in said second direction.

25. The method for fabricating a spin valve magnetoresistive head of claim 20, wherein said step of depositing said longitudinal bias layers deposits said layers overlying and in physical contact with said ferromagnetic sense layer at each of said end regions thereof.

26. The method for fabricating a spin valve magnetoresistive head of claim 20, wherein said step of depositing longitudinal bias layers comprises depositing said second antiferromagnetic film adjacent to and in contact with a portion of said ferromagnetic sense layer in each said end region thereof, said portion of said ferromagnetic sense layer in each said end region exchange-coupling to said second antiferromagnetic film.

27. The method for fabricating a spin valve magnetoresistive head of claim 20, wherein said step of depositing said longitudinal bias layers comprises depositing said layers abutting and in physical contact with said ferromagnetic sense layer at one of said end regions thereof.

28. A method for fabricating a magnetic air bearing slider and spin valve magnetoresistive head, comprising the steps of:
   providing a slider substrate having a sensor surface;
   depositing a spin valve magnetoresistive sensor comprising a ferromagnetic sense layer, a nonmagnetic spacer layer adjacent to and in contact with said ferromagnetic sense layer, a ferromagnetic reference layer adjacent to and in contact with said nonmagnetic spacer layer, and a first antiferromagnetic film adjacent to and in contact with said ferromagnetic reference layer, on said sensor surface of said substrate in the presence of a magnetic field;
   annealing said spin valve magnetoresistive sensor in the presence of a magnetic field oriented in a first direction to develop exchange coupling between said first antiferromagnetic film and said ferromagnetic reference layer and thereby pin said ferromagnetic reference layer in said first direction, said exchange-coupled ferromagnetic reference layer and first antiferromagnetic film exhibiting a blocking temperature equal to or greater than 300° C.;
   patterning a spin valve magnetoresistive sensor area in a central read region and longitudinal bias areas in end regions of said spin valve magnetoresistive sensor;
   depositing longitudinal bias layers in said end regions in the presence of a magnetic field oriented in a second direction perpendicular to said first direction, said longitudinal bias layers comprising a ferromagnetic film and a second antiferromagnetic film adjacent to and in contact with said ferromagnetic film, and exchange-coupling therewith, said exchange-coupled ferromagnetic film and second antiferromagnetic film exhibiting a blocking temperature equal to or greater than 200° C.; and
   providing an air bearing surface on said substrate at an angle to said sensor surface and substantially perpendicular in at least one plane to said pinned first direction.

29. The method for fabricating a magnetic air bearing slider and spin valve magnetoresistive head of claim 28, wherein said first antiferromagnetic film is selected from one of Ni—Mn, Pd—Mn, and Pt—Mn based films.

30. The method for fabricating a magnetic air bearing slider and spin valve magnetoresistive head of claim 28, wherein said second antiferromagnetic film is selected from one of Ir—Mn, Rh—Mn, and Cr—Mn based films.

31. The method for fabricating a magnetic air bearing slider and spin valve magnetoresistive head of claim 28, wherein said step of depositing said longitudinal bias layers deposits said layers overlying and in physical contact with said ferromagnetic sense layer at each of said end regions thereof.

32. The method for fabricating a magnetic air bearing slider and spin valve magnetoresistive head of claim 28, wherein said step of depositing longitudinal bias layers comprises depositing said second antiferromagnetic film adjacent to and in contact with a portion of said ferromagnetic sense layer in each said end region thereof, said portion of said ferromagnetic sense layer in each said end region exchange-coupling to said second antiferromagnetic film.

33. The method for fabricating a magnetic air bearing slider and spin valve magnetoresistive head of claim 28, wherein said step of depositing said longitudinal bias layers comprises depositing said layers abutting and in physical contact with said ferromagnetic sense layer at one of said end regions thereof.

* * * * *